Patented Nov. 18, 1924.

1,515,642

UNITED STATES PATENT OFFICE.

HERBERT A. WINKELMANN AND HAROLD GRAY, OF AKRON, OHIO, ASSIGNORS TO THE B. F. GOODRICH COMPANY, OF NEW YORK, N. Y., A CORPORATION OF NEW YORK.

AGE-RESISTING RUBBER COMPOSITION AND METHOD OF PRODUCING THE SAME.

No Drawing. Application filed April 2, 1923. Serial No. 629,511.

*To all whom it may concern:*

Be it known that we, HERBERT A. WINKELMANN and HAROLD GRAY, citizens of the United States, residing at Akron, in the county of Summit and State of Ohio, have invented a certain new and useful Age-Resisting Rubber Composition and Method of Producing the Same, of which the following is a specification.

This invention relates to the art of making rubber products having good ageing qualities or resistance to deterioration, and its main object is inexpensively to improve these qualities by a novel method of compounding the rubber with certain ingredients adapted to produce the desired result.

An important purpose we have had in view is to accomplish this result without upsetting the so-called "balance" of the rubber mix—that is, we prefer to deal with compounds whose composition and processing characteristics have already been ascertained or established as to their suitability in rubber articles for particular purposes, so that neither will the formula have to be substantially altered other than by the addition of the age-resister, nor will it be necessary materially to change the time required for such operations as milling, calendering and frictioning, or the time or temperature of vulcanization.

In this way we are enabled to avoid a large amount of slow and expensive trying out of new compounds, for by using our invention it is possible to take many of the standard recipes already in use in a rubber factory, or which may be devised and found suitable for use, and by merely adding our age-resister to the mix, lengthen the time during which the vulcanized product will retain its physical properties such as elasticity, tensile strength and texture.

We have discovered that certain aldehyde-amine condensation products, which are substantially nonaccelerating in the particular mix chosen for the purpose, will effect a marked improvement in the age-resisting qualities of the vulcanized product.

It is permissible under our invention to effect a certain amount of retardation of the cure provided the new ingredient selected for addition to the compound imparts the desired ageing qualities.

It has long been known that certain amines or reaction products of amines and aldehydes, when used as accelerators for the vulcanization of rubber by sulfur, impart valuable ageing qualities to the vulcanized product. It has frequently been attempted to improve the ageing qualities of certain commercial rubber products by the addition of one of these materials to the unvulcanized rubber compound. In the majority of such cases the accelerating power of these substances has upset the "balance" of the standard rubber compound and so required other changes in per cent of sulfur or inorganic accelerators, changes in temperature or speed of calenders, in time or temperature of vulcanization, change of vulcanization from hot air to steam or change in thickness of stock to prevent so-called "rind cures." Such changes necessarily cause wide variations in the physical properties of the vulcanized product and often are not permissible where the product is sold under a standard guarantee or is required to meet specifications written by the consumer.

This invention therefore comprehends a novel means of imparting ageing qualities to a rubber composition without appreciably interfering with the "balance" of the uncured mix and is based on the functional action of certain reaction products of aldehydes and amines, which are described as follows:

Aldehyde-amine condensation products have heretofore been used as accelerators in the vulcanization of rubber as evidenced by the French patent to Bastide, No. 470,883, the British patent to Peachey, No. 7370 (1914) and the U. S. patent to Cadwell, No. 1,417,970. We find that there are many aldehyde-amine condensation products which accelerate the vulcanization of rubber not at all or only to a very limited degree and which in competition with the many high-powered accelerators in this class or in other classes, will find no commercial use as accelerators. We find that these weak or nonaccelerating aldehyde-amine products have the property of imparting highly desirable ageing qualities to a rubber article when incorporated into the rubber mix prior to vulcanization, and that they do not interfere with the action of the organic accelerator already present in the mix or materially affect the conditions of processing of vulcanization under which the mix is normally prepared.

To illustrate the varying functions of different aldehyde-amine condensation products we have investigated each chemical compound mentioned in this specification and tested the vulcanized products. Accelerating properties are shown by higher tensile strengths as compared with the "control" mix which contains no added accelerator or age resister.

A standard or control rubber mix was prepared comprising 100 parts by weight of rubber, 10 parts of zinc oxide, and 3 parts of sulfur. To this mix there was added 0.5 parts of accelerator or age resister. All mixes were vulcanized in a press for 60 minutes under 40 pounds of steam pressure. The limits of error in determining the relatively-high tensile strength of accelerated products are approximately ±100 pounds per square inch.

|  | Tensile in lbs. per square inch. |
|---|---|
| Control mix | 117 to 268 |
| *Aldehyde-amines which are non-accelerators in the above mix.* | |
| Furfuraldehyde-ortho-toluidine | 224 |
| Furfuraldehyde-alpha-naphthylamine | Undercured. |
| Aldol-alpha-naphthylamine | 600 |
| Butylaldehyde-alpha-naphthylamine | 231 |
| Acetaldehyde-ortho-toluidine | 378 |
| *Aldehyde-amines which are accelerators in the above mix.* | |
| Acetaldehyde-aniline | 2,200 |
| Formaldehyde-aniline | 1,439 |
| Butylaldehyde-para-toluidine | 2,390 |
| Acetaldehyde-para-toluidine | 1,275 |
| Formaldehyde-para-toluidine | 1,435 |

A second standard mix was prepared comprising 100 parts of rubber and 8 parts of sulfur, to which there was added 0.5 parts of a condensation product of an aldehyde and an amine. All mixes were cured 75 minutes at 40 pounds steam pressure.

|  | Tensile in lbs. per square inch. |
|---|---|
| Control mix | 810 |
| *Aldehyde-amines which are non-accelerators in the above mix.* | |
| Formaldehyde-para-toluidine | 877 |
| Formaldehyde-alpha-naphthylamine | 532 |
| Formaldehyde-ortho-toluidine | 252 |
| Formaldehyde-beta-naphthylamine | 283 |
| Butylidene-ortho-anisidine | 711 |
| *Aldehyde-amines which are accelerators in the above mix.* | |
| Acetaldehyde-aniline | 3,085 |
| Heptylidene-aniline | 3,747 |
| Butylaldehyde-para-phenetidine | 2,000 |
| Anisicaldehyde-para-toluidine | 1,380 |

Of the foregoing substances, aldol-alpha-naphthylamine and furfuraldehyde-ortho-toluidine are regarded as the most suitable, both being relatively cheap and high in age-resisting properties, the latter substance being free from odor and the former nearly so. The former is a solid and the latter may be made so, which is considered a practical advantage in handling, while the former is high in fluxing power and the latter only slightly less so.

It is well known that thiocarbanilide is a powerful accelerator in the presence of zinc oxide, that in the absence of zinc oxide it is practically inert and that in a litharge stock it retards vulcanization. From the above tabulation it will be noted that the formaldehyde reaction product of para-toluidine functions as an accelerator in the presence of zinc oxide but is without accelerating power in its absence. Again we find that butylidene-alpha-naphthylamine shortens the time of vulcanization of a litharge-rubber-sulfur mix while it has little or no effect without the aid of the lead compound. It is further found that a change in the relative percentages of sulfur and accelerator will aid, retard or even prevent the proper functioning of the organic catalyst.

Such examples clearly define the proper embodiment of this invention in its first prerequisite, namely, that the age resister must have little or no effect on the "balance" of the rubber mix to which it is added, this prerequisite being determined by the composition of the rubber mix as well as by the character of the age resister itself.

The effect of these aldehyde-amines on the ageing of vulcanized rubber have been tested according to the "Accelerated ageing test" published by W. W. Evans in the American Society for Testing Materials vol. 22, Part II, p. 549 (1922).

*Example 1.*—A rubber mix is prepared from the following ingredients, all figures indicating parts by weight. Rubber—100, clay—20, whiting—30, zinc oxide—10, gas black—15, sulfur—4.28, litharge—3.8 and diphenylguanidine—0.76. This mix is then divided into two equal portions to which are added respectively 1.9 parts of a flux such as palm oil and 1.9 parts of butylidene-alpha-naphthylamine as a combined flux and age resister. Test sheets are cured in a press for 30 minutes with 35 pounds steam pressure in the heating units. On subjecting the cured sheets to the "Accelerated ageing test" in an oven at 158° F., we find the following comparative tests showing the effect of the aldehyde-amine on the physical properties of the cured sheet. One day of accelerated test is approximately equal to six months of natural ageing.

| Days in oven. | Palm oil. | | Butylidene-alpha-naphthylamine. | |
| --- | --- | --- | --- | --- |
| | Tensile lbs. per sq. in. | Elongation %. | Tensile lbs. per sq. in. | Elongation %. |
| 0 | 2,521 | 607 | 2,616 | 587 |
| 2 | 2,072 | 563 | 2,588 | 517 |
| 4 | 1,539 | 553 | 2,467 | 523 |
| 7 | 1,184 | 543 | 2,213 | 530 |
| 9 | 1,086 | 507 | 2,331 | 497 |
| 11 | 1,000 | 480 | 2,122 | 517 |
| 14 | 1,039 | 483 | 2,111 | 500 |

*Example 2.*—The aldol condensation product of alpha-naphthylamine is substituted for the butylidene-amine in Example No. 1. Accelerated ageing tests give the following comparative data:

| Days in oven. | Palm oil. | | Aldol-alpha-naphthylamine. | |
| --- | --- | --- | --- | --- |
| | Tensile lbs. per sq. in. | Elongation %. | Tensile lbs. per sq. in. | Elongation %. |
| 0 | 2,880 | 660 | 2,875 | 580 |
| 2 | 2,050 | 550 | 2,825 | 525 |
| 4 | 1,800 | 550 | 2,750 | 550 |
| 7 | 1,425 | 525 | 2,650 | 500 |
| 9 | 1,250 | 500 | 2,400 | 500 |
| 11 | 1,175 | 500 | 2,175 | 500 |
| 14 | 900 | 460 | 2,100 | 450 |

*Example 3.*—The furfuraldehyde condensation product of alpha-naphthylamine is substituted for the butylidene-amine in Example No. 1. Ageing in the hot air oven at 158° F. gives the following tests:

| Days in oven. | Palm oil. | | Furfuraldehyde-alpha-naphthylamine. | |
| --- | --- | --- | --- | --- |
| | Tensile lbs. per sq. in. | Elgonation %. | Tensile lbs. per sq. in. | Elgonation %. |
| 0 | 2,880 | 660 | 2,675 | 580 |
| 2 | 2,050 | 550 | 2,450 | 550 |
| 4 | 1,800 | 550 | 2,300 | 550 |
| 7 | 1,425 | 525 | 1,975 | 475 |
| 9 | 1,250 | 500 | 1,900 | 475 |
| 11 | 1,175 | 500 | 1,900 | 480 |
| 14 | 900 | 460 | 1,800 | 460 |

*Example 4.*—The furfuraldehyde condensation product of ortho-toluidine is substituted for the aldehyde-amine in Example No. 1.

*Accelerated ageing tests.*

| Days in oven. | Palm oil. | | Furfuraldehyde ortho-toluidine. | |
| --- | --- | --- | --- | --- |
| | Tensile lbs. per sq. in. | Elongation %. | Tensile lbs. per sq. in. | Elongation %. |
| 0 | 2,880 | 660 | 2,870 | 560 |
| 2 | 2,060 | 500 | 3,020 | 530 |
| 4 | 1,810 | 530 | 2,701 | 510 |
| 7 | 1,430 | 500 | 2,500 | 530 |
| 9 | 1,240 | 480 | 2,380 | 520 |
| 11 | 1,190 | 490 | 2,190 | 500 |
| 14 | 900 | 430 | 2,250 | 490 |

An advantageous application of this invention is found in rubber mixes accelerated with the lead salts of dithio-carbamic acids or containing lead compounds and dithio-carbamates or thiuram-disulfides. Such mixes often have a tendency to age poorly. The addition of from 0.25 to 2.0 parts ($\frac{1}{4}$ to 2 per cent on the weight of the rubber) of a non-accelerating aldehyde-amine imparts admirable ageing qualities to the vulcanized rubber article.

In rubber mixes accelerated by the use of zinc dithio-carbamates, the rate of vulcanization is frequently further accelerated by the addition of an otherwise non-accelerating aldehyde-amine, whereby the advantages of this invention are not obtained.

We do not wish wholly to limit ourselves to any definite sub-class of aldehyde-amines as age resisters since a given material may function properly in one mix and not in another, the examples given being sufficient to instruct those skilled in the art in the use of this invention without exhausting the list of substances which may fall within its scope.

We claim:

1. The method of producing a rubber composition which comprises adding to a rubber compound of established vulvanizing characteristics an aldehyde-amine reaction product which is substantially a non-accelerator of vulcanization in said compound.

2. The method of producing a rubber composition which comprises adding to a rubber compound of established vulcanizing characteristics an aldehyde-amine reaction product which is substantially a non-accelerator of vulcanization in said compound, and then vulcanizing said compound.

3. The method of producing a rubber composition which comprises mixing rubber with an organic accelerator and an aldehyde-amine reaction product which is substantially non-accelerating in the mixture, and vulcanizing the mixture.

4. The method of making rubber products which comprises adding aldol-alpha-naphthylamine to a rubber compound and vulcanizing the compound.

5. The method of making rubber products which comprises adding aldol-alpha-naphthylamine and an organic accelerator to a rubber compound and vulcanizing the compound.

6. The method of producing a rubber composition which comprises mixing aldol-alpha-naphthylamine with a rubber compound in which it is substantially a non-accelerator of vulcanization, and vulcanizing the mixture.

7. The method of producing a rubber composition which comprises mixing aldol-alpha-naphthylamine with a rubber compound including an organic accelerator and of established vulcanizing characteristics substantially unaffected by the presence of the aldol-alpha-naphthylamine, and vulcanizing the mixture.

8. The method of producing a rubber composition which comprises adding to a rubber compound of established vulcanizing characteristics from ¼ to 2 per cent on the weight of the rubber of an aldehyde-amine reaction product which is substantially a non-accelerator of vulcanization in said compound.

9. A vulcanized rubber product containing a small proportion of a substantially non-accelerating, aldehyde-amine age resister.

10. A composition containing rubber and aldol-alpha-naphthylamine.

11. A vulcanized rubber product containing ¼ to 2 per cent on the weight of the rubber of aldol-alpha-naphthylamine.

In witness whereof we have hereunto set our hands this 31st day of March, 1923.

HERBERT A. WINKELMANN.
HAROLD GRAY.